(12) United States Patent
Marowsky-Bree et al.

(10) Patent No.: US 7,925,761 B2
(45) Date of Patent: Apr. 12, 2011

(54) SYSTEM AND METHOD FOR IMPLEMENTING A DEAD MAN DEPENDENCY TECHNIQUE FOR CLUSTER RESOURCES

(75) Inventors: Lars Marowsky-Bree, Hamburg (DE); Andrew John Beekhof, Hallbergmoos (DE)

(73) Assignee: Novell, Inc., Provo, UT (US)

( * ) Notice: Subject to any disclaimer, the term of this patent is extended or adjusted under 35 U.S.C. 154(b) by 101 days.

(21) Appl. No.: 12/495,059

(22) Filed: Jun. 30, 2009

(65) Prior Publication Data

US 2010/0332659 A1 Dec. 30, 2010

(51) Int. Cl.
*G06F 15/16* (2006.01)

(52) U.S. Cl. ........ 709/226; 709/200; 709/224; 709/223; 709/225; 709/208; 709/248; 709/220; 709/213; 709/222; 718/102; 718/105; 718/100; 707/658; 707/703; 707/769; 719/314

(58) Field of Classification Search .................. 709/200, 709/224, 226, 223, 208, 222, 213, 220, 248
See application file for complete search history.

(56) References Cited

U.S. PATENT DOCUMENTS

| | | | | |
|---|---|---|---|---|
| 6,671,704 B1 * | 12/2003 | Gondi et al. | .................. | 707/648 |
| 2007/0027975 A1 * | 2/2007 | Tai et al. | ........................ | 709/223 |
| 2008/0126829 A1 | 5/2008 | Robertson et al. | | |

* cited by examiner

*Primary Examiner* — Jude J Jean Gilles
(74) *Attorney, Agent, or Firm* — Haynes and Boone, LLP (57) ABSTRACT

Method and system for implementing a dead man dependency technique in a cluster comprising a plurality of interconnected nodes, one of the nodes comprising a cluster resource manager (CRM), and one of the nodes comprising a policy engine (PE), the PE maintaining at least one dependency associated with a first resource executing on one of the nodes. In an embodiment, the method comprises, responsive to a status change of an attribute associated with the first resource, the PE receiving from the CRM an indication of the status change and information regarding a configuration of the cluster; responsive to receipt of the status change indication and the configuration information, identifying by the PE a manner of terminating and migrating the first resource to another one of the nodes; and providing by the PE to the CRM an instruction sequence for causing the identified manner of terminating and migrating the first resource.

20 Claims, 4 Drawing Sheets

SYSTEM AND METHOD FOR IMPLEMENTING A DEAD MAN DEPENDENCY TECHNIQUE FOR CLUSTER RESOURCES

BACKGROUND

Clusters of servers or nodes are frequently used to deliver network services. In that regard, the clusters manage resources that provide services. In response to a failure of a node in the cluster, the cluster must ensure that the service is stopped on the failed node before migrating the service to another node. One approach for accomplishing this is for the cluster to issue a stop command to the failed node; however, this approach often requires the cluster management to wait a period of time, e.g., a "timeout," to be certain that a failure has actually occurred. Upon expiration of the timeout period, node failure can be inferred, at which point cluster management can safely shut down, re-power, and re-start the failed node so that it is eventually prepared to provide services. Clearly, this process can require a fairly significant amount of time.

The foregoing situation is further complicated by the fact that certain resources running on a node may have dependencies that affect the order in which resources must be shut down. Clearly, the need to properly sequence the shut down of the resources increases the overall time required to shut down all resources and thereby increases the amount of time needed before the cluster management can infer that the resources have been successfully shut down.

The foregoing situation is still further complicated by the fact that services may be provided by clusters that are independent and geographically dispersed. Due to the nature of independent and geographically dispersed clusters, inference and/or confirmation of node failures at other geographical locations encounter similar problems as described above. For example, in the case of a link failure at a site, confirmation of termination of resources at that site can not be forwarded to another site. Therefore, waiting for a timeout period is a prudent approach for confirming termination of resources. In particular, a cluster at the other site can infer the failure of a node at the site with the link failure based on timeouts. In such cases, the site inferring the failure of a node must be able to assume that N seconds after the other site has been detected as dead, all resources on that other site have been stopped. This takes a certain minimum amount of time, even after the failed node has been appropriately shut down.

In yet another scenario, for delivery of a particular service, a resource in one cluster may depend on another resource in another independent cluster. In this situation, the dependencies of resources in different independent and geographically dispersed nodes increases the amount of time required to accurately confirm proper shut down of the failed nodes. Therefore, although the approach discussed above has been generally adequate for its intended purposes, it has not been entirely satisfactory in all respects.

SUMMARY

One embodiment is a method for implementing a dead man dependency technique in a cluster comprising a plurality of interconnected nodes, one of the nodes comprising a cluster resource manager, and one of the nodes comprising a policy engine, the policy engine maintaining at least one dependency associated with a first resource executing on one of the nodes. For example, the method comprises, responsive to a status change of an attribute associated with the first resource, the policy engine receiving from the cluster resource manager an indication of the status change; the policy engine receiving from the cluster resource manager information regarding a configuration of the cluster; responsive to receipt of the status change indication and the configuration information, identifying by the policy engine a manner of terminating the first resource and migrating the first resource to another one of the nodes; and providing by the policy engine to the cluster resource manager an instruction sequence for causing the identified manner of terminating the first resource and migrating the first resource to another one of the nodes.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

Figure 1:
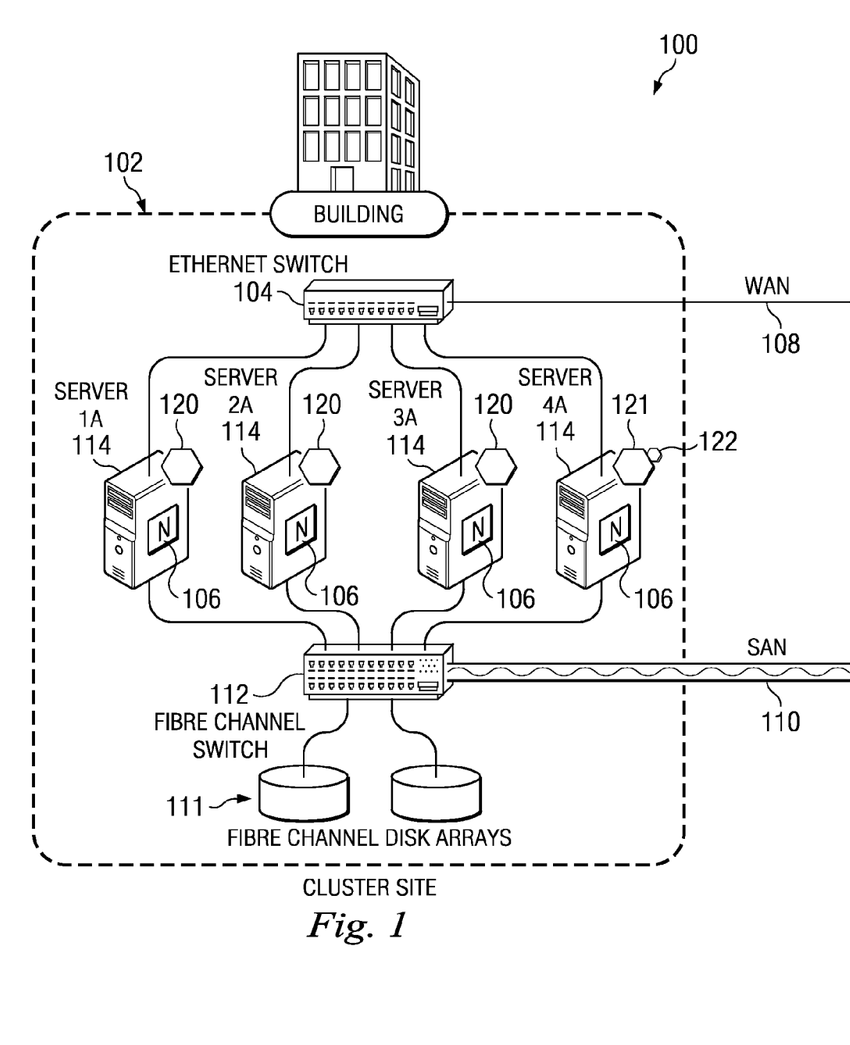
FIG. 1 is a block diagram of a cluster system in which an embodiment of a dead man dependency technique for cluster resource management may be implemented.

FIG. 1 illustrates a Business Continuity Clustering ("BCC") system 100 comprising an independent cluster 102. As illustrated in FIG. 1, the cluster 102 includes an Ethernet switch 104 for connecting a plurality of servers, or nodes, 106, to a wide area network ("WAN") 108. The servers 106 are connected to a storage area network ("SAN") 110 via a fiber channel switch 112. In accordance with features of one embodiment, each server 106 of the cluster 102 includes a business continuity engine ("BCE") 114. The BCEs 114 each comprise a system that provides a means of managing and controlling Business Continuity ("BC") applications. In accordance with features of one embodiment, each server 106 of the cluster 102 includes a BCE 114.

In the illustrated embodiment, the cluster 102 includes a cluster resource manager 120 that is present on each of the servers 1A, 2A, and 3A, and a cluster resource manager 121 that is present on server 4A. The cluster resource manager 121 is identical in all respects to the cluster resource manager 120, except that it has associated therewith a policy engine 122. The cluster resource managers 120, 121 are logical entities that manage all aspects of resource allocation for the delivery of services. Moreover, the cluster resource managers 120, 121 maintain an overview of the configuration of the cluster 102. The cluster resource manager 121 observes events in the cluster 102 and reports events to the policy engine 122. The policy engine 122 includes and maintains dependencies of resources for the provision of resources.

Figure 2:
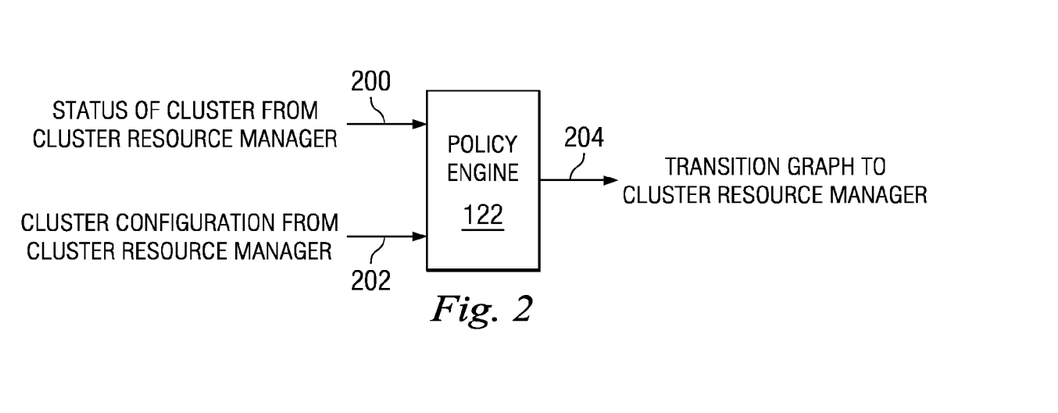
FIG. 2 is a block diagram of one embodiment of a policy engine of the cluster system of FIG. 1.

FIG. 2 provides additional details regarding the policy engine 122 shown in FIG. 1. In particular, FIG. 2 is a block diagram illustrating two inputs and an output of the policy engine 122 that are pertinent to a dead man dependency technique, described later in more detail. As shown in FIG. 2, the policy engine 122 receives a status of the cluster 102 from the cluster resource manager 121, via an input 200. The cluster status informs the policy engine 122 of the current status of the cluster 102. For example, included in this information is the status of each node in the cluster 102. Additionally, the policy engine 122 receives the current configuration from one of the cluster resource managers 102, 121 as an input 202. For example, included in this information is the current configuration of the cluster 102.

The policy engine 122 includes a set of dependencies regarding the resources in the cluster 102. In general, as one of the cluster resource managers 120, 121 observes events in the cluster 102, some events may trigger the policy engine 122 to reconfigure the provisioning of resources in the cluster 102. In that regard, the policy engine 122 operates on the status and configuration of the cluster 102 from inputs received from one of the cluster resource managers 120, 121. Then, based on the dependencies maintained by the policy engine 122 and the status and configuration of the cluster 102, the policy engine 122 provides back to the cluster resource manager 121 the information necessary for the cluster resource manager 120, 121 to provision resources and perform failover migration of a failed node. In this regard, the policy engine 122 provides a transition graph to the cluster resource manager 120, 121, as an output 204. The transition graph includes a set of actions and sequencing instructions that is implemented by the cluster resource manager 120 to achieve the desired state, which in this case includes performing failover migration of the failed node. In addition, the policy engine 122 implements a dead man dependency technique, as described later in further detail.

The interaction between the cluster resource managers 120, 121, and the policy engine 122 will now be described. First, provided is an example of an event that occurs in the system of FIG. 1. In one example, a service provided by the cluster 102 requires a database server running on server 1A. Moreover, the services require that the database server has a connection to the fiber channel switch 112 and fiber channel disk arrays 111. Accordingly, the policy engine 122 maintains this dependency information. In normal operation, during provisioning of the service, the server 1A functions appropriately with access to the fiber channel switch 112 and the fiber channel disk arrays 111. However, consider for example a scenario in which the link between the server 1A and the fiber channel switch 112 is severed; as a result, the server 1A no longer has connection to the fiber channel switch 112 and the fiber channel disk arrays 111, further resulting in a node failure in the cluster 102 and interruption of the delivery of services.

The cluster resource manager 121 observes the node failure in the cluster 102. In response to a node failure in the cluster 102, it is desirable to provide failover to reduce recovery time of the resource and speed up the availability of the service. The cluster resource manager 121 provides the change in state of the cluster 102 to the policy engine 122. For example, this state information is provided to the policy engine 122 in the form of a status of the cluster 102, via the input 200 (FIG. 2). In this scenario, the policy engine 122 is informed that the connection between the server 1A and the fiber channel switch 112 is severed. Moreover, the policy engine 122 is informed of the current state of the cluster configuration via the input 202 (FIG. 2).

As mentioned above, the policy engine 122 maintains therein a dependency that the database server running on server 1A has connectivity with the fiber channel switch 112 and fiber channel disk arrays 111. Therefore, upon being informed via the input 200 (FIG. 2) that the connectivity between the server 1A and the fiber channel switch 112 has been severed, the policy engine 122 is triggered to determine a transition graph so that the cluster resource manager 121 can, in turn, begin performing failover migration. In this regard, the policy engine 122 analyzes the current cluster configuration provided by the cluster resource manager 121 via the input 202 (FIG. 2) and determines another node that can run the database server. For example, the policy engine 122 determines that the database server should be run on the server 2A. Accordingly, the policy engine generates a transition graph that includes a set of corresponding actions and sequencing instructions to accomplish the failover migration of the database from the server 1A to the server 2A and provides the transition graph to the cluster resource manager 121 via the output 204. In this regard, the transition graph instructs the cluster resource manager 121 with the specific sequence to shut down the failed node and perform failover migration.

In alternative examples, an event observed by the cluster resource manager 121 includes a change implemented by a cluster administrator. For example, the cluster administrator may change a rule related to the permitted configuration of resources in the cluster 102. As a more detailed example, the cluster administrator can decide that server 2A cannot have connectivity with the fiber channel disk arrays 111. In this scenario, the policy engine 122 recognizes that in a failover migration scenario, the database server on the failed node server 1A cannot be migrated to server 2A. Therefore, the policy engine 122 considers, for example, only servers 3A and 4A as potential servers for failover migration. In general, there are many different changes that the cluster administrator can implement, and the example just described is merely one example. In general, changes initiated by the cluster administrator can trigger the policy engine 122 to redistribute resources in the cluster 102 for the delivery of services.

One embodiment of the dead man dependency technique will now be described in detail. The dead man dependency technique reduces the time required to complete failover migration. Normally, in response to a node failure and in preparing for failover migration, the cluster resource manager provides orderly shutdown, or "cleanup," of the resources associated with the failed node. In that regard, the cluster resource manager requires a certain amount of time to elapse, for example, a timeout, before being able to determine a final positive or negative result for the issued stop operation. Moreover, shutdown of the resources associated with the failed node frequently requires sequencing that can further delay the time required between initiating shutdown and confirmation that orderly shutdown has occurred. However, employing the dead man dependency technique implemented in the cluster 102, instead of the performing orderly shut down of the resources associated with the failed node, the cluster resource manager 121 can simultaneously shut down all the resources associated with the failed node. As a result, the amount of time required to complete failover migration is reduced because the cluster resource manager need not provide orderly shutdown to resources associated with the failed node.

A more detailed description of a dead man dependency technique that may be implemented in the systems of FIGS. 1 and 2 will now be provided. As above, this description relates to the example most recently described and focuses primarily on the implementation of the dead man dependency technique. In response to receiving the status change and the configuration of the cluster 102 from the cluster resource manager 121, the policy engine 122 identifies a manner of terminating the database server running on server 1A and migrating the database server to another node in the cluster 102. The policy engine 122 identifies the manner of termination and migration based on the dependencies maintained therein. For example, where other resources and the database server have associated dependencies, the policy engine 122 identifies a manner of termination that includes simultaneously shutting down those resources associated with the database server. The policy engine 122 incorporates the shutdown of resources into the transition sequence, or transition graph, that is provided to the cluster resource manager 121. In turn, the cluster resource manager 121 carries out the instructions in accordance with the transition graph to effect failover migration and speedy recovery of the service. According to this approach, the dead man dependency technique reduces the delay between initiating termination of resources on the failed node and confirmation that the resources have been terminated. Consequently, the dead man dependency technique reduces downtime and increases availability of services in a cluster system 102.

Figure 3:
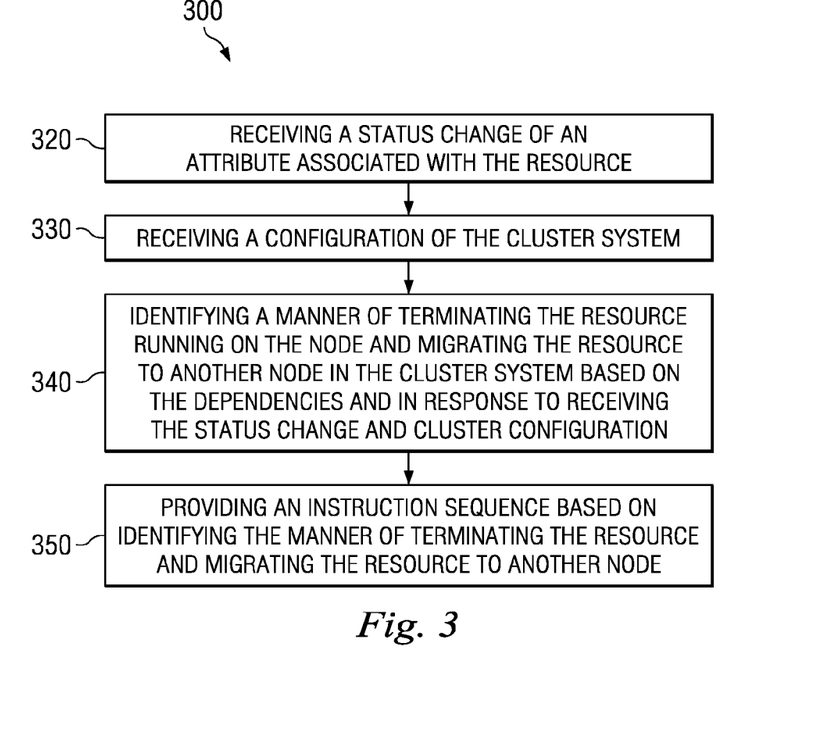
FIG. 3 is a flow chart of a method for implementing a dead man dependency technique in accordance with one embodiment.

FIG. 3 is a flowchart that depicts a method 300 for a dead man dependency technique that can be implemented by the policy engine 122 of the cluster system 100 shown in FIG. 1. In addition, the method 300 can be implemented by a policy engine of an alternative cluster system shown in FIG. 4. As previously noted, dependencies associated with a resource present on a node in a cluster system are maintained by the policy engine 122 (FIG. 1). In block 320, a status change of an attribute associated with the resource is received by the policy engine 122 from the cluster resource manager 121 (FIG. 1). In block 330, a configuration of the cluster system is received by the policy engine 122 from the cluster resource manager 121. In block 340, a manner of terminating the resource that is present on the node and migrating the resource to another node in the cluster system based on the dependencies and in response to receiving the status change and cluster configuration are identified by the policy engine 122. In block 350, an instruction sequence based on identifying the manner of terminating the resource and migrating the resource to another node is identified by the policy engine 122. In an alternative embodiment, the failed node is "fenced" in block 350. Node fencing isolates the failed node from cluster resources to prevent the failed node from being able to access cluster resources.

Figure 4:
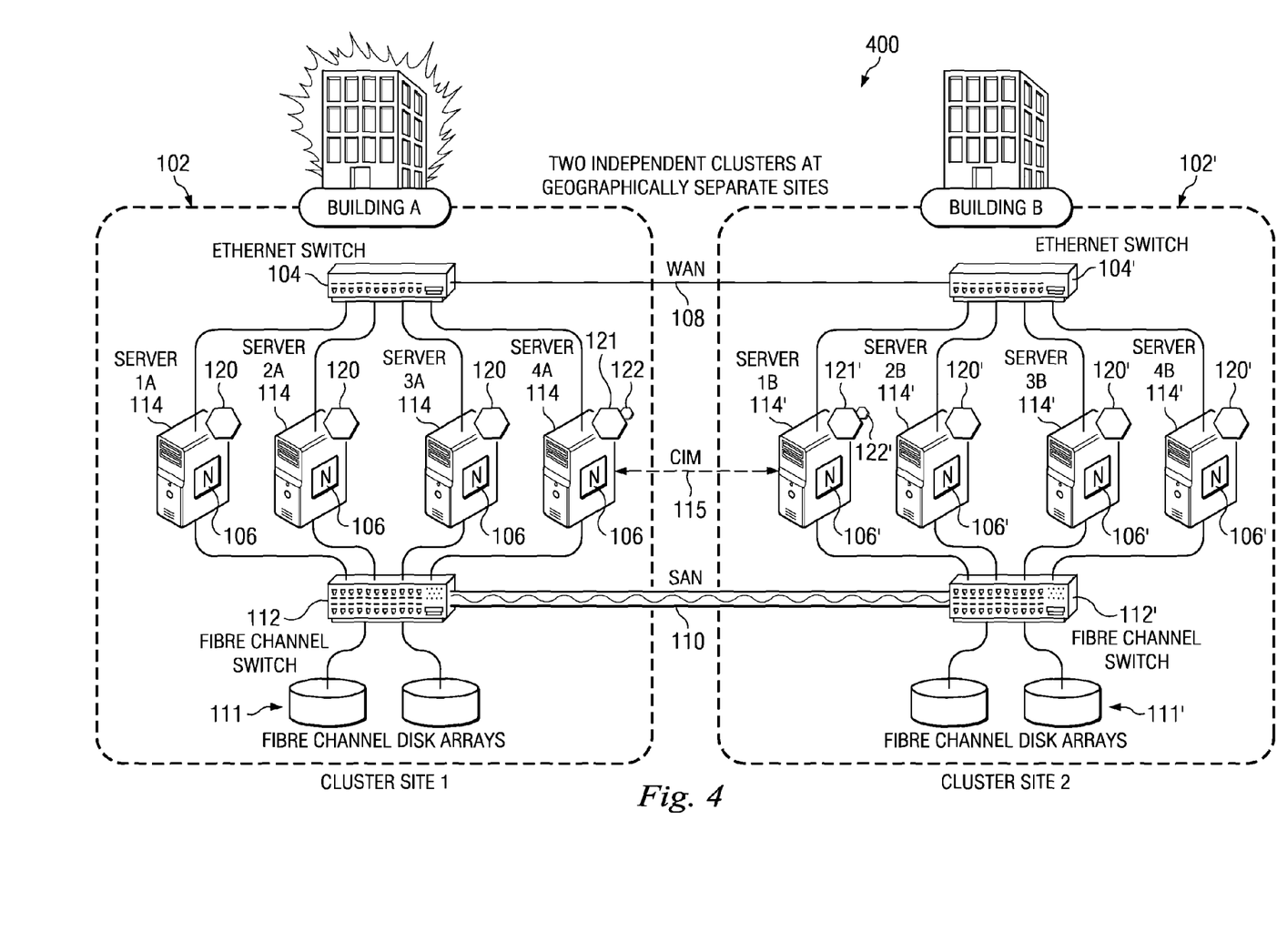
FIG. 4 is a block diagram of an alternative cluster system in which an embodiment of a dead man dependency technique for cluster resource management may be implemented.

FIG. 4 illustrates a cluster system 400 that is an alternative embodiment of the cluster system 100 shown in FIG. 1. Identical or equivalent elements are identified by the same reference numerals, and the following discussion focuses primarily on the differences. FIG. 4 illustrates an alternative BCC system 400 comprising two independent, geographically dispersed clusters 102, 102'. For purposes of example and explanation, the cluster 102 will be designated the primary cluster, while the cluster 102' will be designated the secondary cluster. In the cluster system 400, the secondary cluster 102' mirrors the primary cluster 102. In particular, the secondary cluster 102' includes an Ethernet switch 104' for connecting a plurality of servers, or nodes, 106', to a WAN 108. The servers 106' are connected to the SAN comprising a fiber channel 110 and multiple fiber channel disk arrays 111, 111', via a fiber channel switch 112'. In accordance with features of one embodiment, each server 106' of the secondary cluster 102' includes a BCE 114'. The BCEs 114, 114' each comprise a system that provides a means of managing and controlling BC applications. The BCEs 114, 114' communicate via a common information model ("CIM") 115. In an alternative embodiment the BCEs 114, 114' communicate using a different mechanism.

In further detail, the cluster 102' has a cluster resource manager 121' that is present on each of the servers 2B, 3B, and 4B. Moreover, the cluster 102' has a cluster resource manager 121' that is present on server 1B. The cluster resource manager 121' is identical in all respects to the cluster resource manager 120', except that it has associated therewith a policy engine 122' that is similar to the policy engine 122. The cluster resource manager 121' observes events in the cluster 102' and reports events to the policy engine 122'. The policy engine 122' includes and maintains dependencies of resources for the provision of resources.

Now provided is an example of an event that occurs in the system of FIG. 4. Similar to a previously discussed example (relating to FIG. 1), a service provided by the cluster 102 requires a database server running on server 1A. In contrast to the previous example, in this example a disruptive event occurs at Building A (cluster site 1) and therefore failover migration from Building A to Building B (cluster site 2) is desired. In this example, a token is maintained by a cluster resource administrator (not illustrated) and observed by the cluster resource manager 121. Here, the token represents the connectivity between the database server running on server 1A and the fiber channel switch 112 and disk arrays 111. The token is used by the cluster resource manager 121 to enforce particular policies. For example, the database server on server 1A is not initiated if the token is not owned by the cluster 102. In addition, if the database server is running on the server 1A and the token is not owned or for example, is lost, the node on which the database server is active, that is server 1A, is scheduled for immediate rebooting and/or fencing.

Some of the embodiments discussed above use a token as a source for dependency. In that regard, the token may be provided by a cluster token registry, such as that described in U.S. patent application Ser. No. 12/477,364, entitled SYSTEM AND METHOD FOR IMPLEMENTING A CLUSTER TOKEN REGISTRY FOR BUSINESS CONTINUITY, which is assigned to the assignee of the present application and is hereby incorporated by reference in its entirety.

The disruptive event at Building A causes the token to be lost, which in turn is observed by the cluster resource manager 121. Unlike in the previous example, in the present example, the database server on server 1A cannot be locally restarted at cluster site 1 because no other server in cluster site 1A has a token. In this instance, Building B acquires a token from, for example, a cluster resource administrator (not illustrated). In other instances, there is another cluster site at a Building C that monitors Buildings A and B. In that regard, if both Buildings B and C cannot communicate with Building A, then it is inferred that there is a failure at Building A. In that instance, it is determined that the Building B can receive a token.

In response to the cluster 102' at Building B receiving a token, the cluster resource manager 121' observes the acquisition of the token from the cluster resource administrator (not illustrated). In due course, this observation by the cluster resource manager 121' is reported to the policy engine 122' along with the current configuration of the cluster 102' at Building B. Having the token, the cluster 102' performs failover migration of the database server that was running on server 1A in cluster 102. For example, here, the database server is migrated to server 2B.

Now a discussion is provided that illustrates the timing of events for the failover migration example previously described without the dead man dependency technique being implemented in the cluster system 400 shown in FIG. 4. An analogous discussion is subsequently provided that illustrates the timing of events for the same failover migration example but having the dead man dependency technique being implemented in the cluster system 400 shown in FIG. 4.

Figure 5:
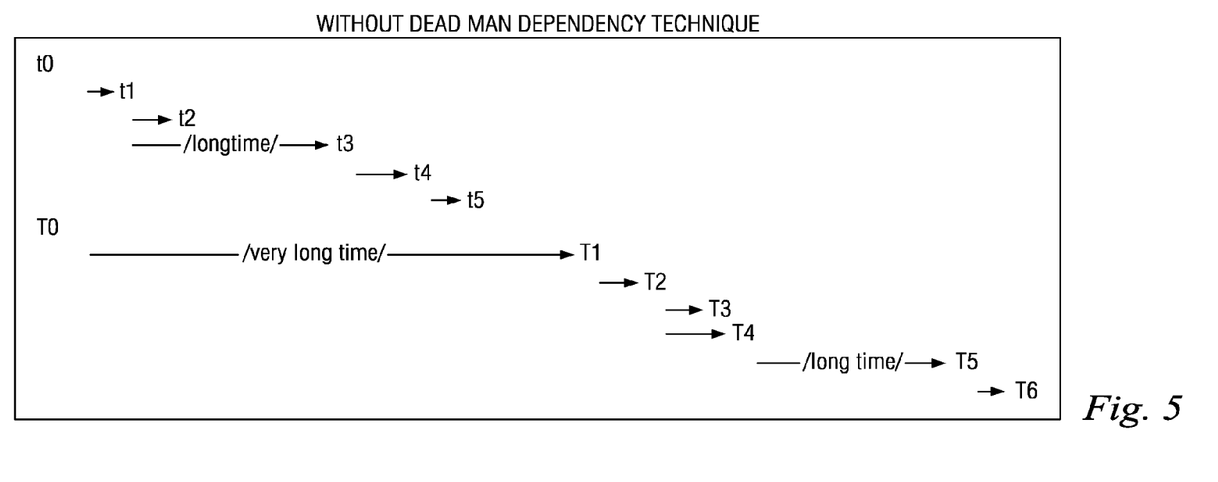
FIG. 5 is a timing diagram depicting the timing of events in a cluster in which the dead man dependency technique illustrated in FIG. 3 is not implemented.

FIG. 5 is a timing diagram depicting the relative timing of events and resources A, B, and C in the cluster system of FIG. 4 without a dead man dependency technique being implemented. FIG. 5 depicts timing for three different resources, A, B, and C. Resource A is a fast resource, resource B is a slow resource, and resource C is needed by resource B in order to provide effective services. In other words, resource B depends on resource C. The events that occur at Site 1 (FIG. 4) are represented by lower case t, "t." The events that occur at Site 2 (FIG. 4) are represented by upper case t, "T."

Referring now to FIG. 5, the timing of events at Site 1 will first be described, after which the timing of events at Site 2 will be described. At time t0, a token for Site 1 is lost after the disruptive event at Building A occurs. Accordingly, the system needs to prepare to migrate resources A, B, and C from Site 1 to Site 2. At time t1, the cluster resource manager 121 at Site 1 calculates and begins recovery actions to migrate resources A, B, and C from Site 1 to Site 2. In that regard, termination of resources A and B at Site 1 are initiated simultaneously since the resources are independent of each other; however, termination of resource C at Site 1 is not initiated until after termination of resource B is complete, since resource B is dependent on resource C. As illustrated in FIG. 5, termination of resource A is complete at a time t2. In contrast, termination of resource B is not complete until a time t3, which occurs a significant amount of time after termination of resource B was initiated. The reason for this delay is that, as mentioned above, B is a slow resource while A is a fast resource. After termination of resource B is complete, termination of resource C is initiated and is completed at a time t4. Then, at a later time t5, the system is certain that all of the resources A, B, and C have been shut down and thus, Site 1 recovery is complete.

Turning to the timing of events at Site 2, at a time T0, communication with Site 1 is lost. As mentioned above, the cluster at Site 2 must wait to be sure that the resources at Site 1 have been completely terminated. Accordingly, Site 2 makes sure an appropriate timeout has occurred to ensure that resources A, B, and C on Site 1 have been terminated. This process takes a very long time, and it is not until a time T1 that Site 2 acquires a token after timeout at t5 from the cluster resource administrator (not illustrated in FIG. 4). With the token having been acquired at time T1, Site 2 is now ready (at time T2) to start recovery of the resources A, B, and C that were terminated at Site 1. Accordingly, Site 2 initiates the start-up of resources A and C. However, since resource B depends on resource C, the start of resource B is delayed until after the start-up of resource C is completed. At times T3 and T4, start-up of resources A and C at Site 2 are respectively initiated. After the start of resource C has been completed, Site 2 initiates start-up of resource B. As illustrated, start-up of resource B at Site 2 is completed at a time T5. It will be noted that resource B is started-up at a time T5 that occurs a significant period of time after start-up of resource C at Site 2 is completed (time T4), since resource B is a slow resource. After start-up of resource B at Site 2 is completed at the time T5, all the resources A, B, and C have been started. At a time T6, failover migration is complete.

As illustrated in FIG. 5, it is clear that a very long time transpires between the time T0 when the communication between Site 2 and Site 1 is lost, and the time T1 when Site 2 receives timeout of resources A, B, and C running at Site 1 that indicates it is safe to start recovery of the resources at the time T2. It will be noted, however, that after time t5, it is safe to restart resources A, B, and C at Site 2, as those resources have all been properly terminated at Site 1. However, Site 2 does not know this and must continue waiting for the timeout (time T1) to confirm that the resources A, B, and C have been shut down. The following discussion focuses on an illustration of how one embodiment of the dead man dependency technique speeds recovery of the services being rendered by resources A, B, and C. In particular, the discussion focuses on an illustration of how the dead man dependency technique shortens the time that Site 2 must wait to assume that the resources A, B, and C have been properly terminated (that is, the time between time T0 and T1 in FIG. 5).

Figure 6:
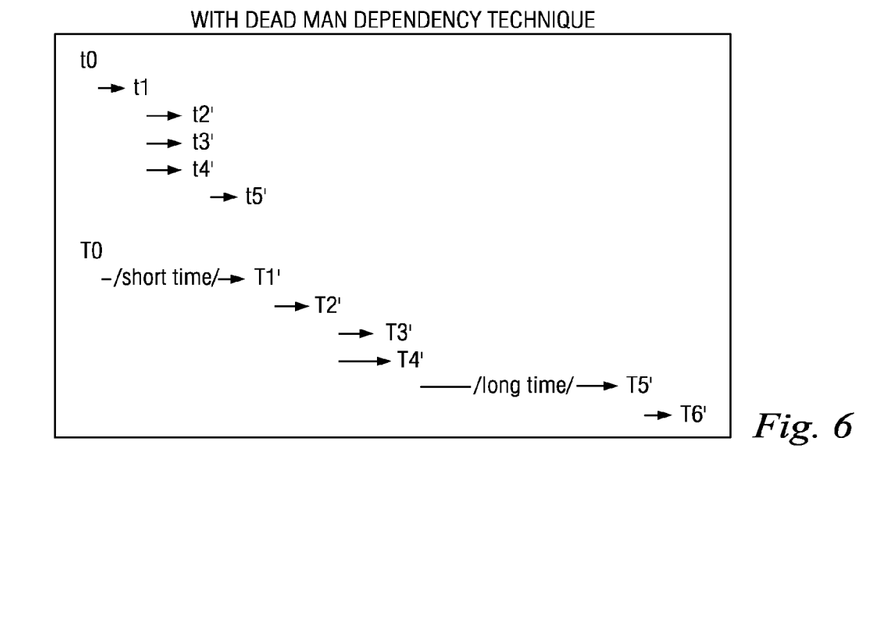
FIG. 6 is a timing diagram depicting the timing of events in a cluster in which the dead man dependency technique illustrated in FIG. 3 is implemented.

FIG. 6 illustrates a timing diagram depicting the timing of events and resources A, B, and C in the cluster system of FIG. 4 with a dead man dependency technique being implemented. Identical or equivalent elements are identified by the same reference numerals as shown in FIG. 5, and the following discussion focuses primarily on the differences. Similarly to the discussion of FIG. 5, the present focuses first on the timing of events at Site 1, and then focuses on the timing of events at Site 2.

At time t0 the token for Site 1 is lost At time t0, a token for Site 1 is lost after the disruptive event at Building A occurs. At time t1, the cluster at Site 1 calculates and begins recovery actions so that resources A, B, and C can be moved from Site 1 to Site 2. At this point, the timing of events in FIG. 6 (with dead man dependency) start to vary from the timing of events in FIG. 5 (without dead man dependency). With dead man dependency, the resources A, B, and C are simultaneously shut down at times t2', t3', and t4', respectively. Then, at time t5' the cluster is sure of complete termination of the resources A, B, and C at Site 1 and thus, Site 1 recovery is complete.

As illustrated in FIG. 6 (with dead man dependency being implemented), the time between Site 1 beginning recovery of resources A, B, and C (time t1) and the system being sure that Site 1 recovery is complete (time t5') is reduced in comparison to the analogous timing t1 and t5 shown in FIG. 5 (without dead man dependency being implemented). Accordingly, FIG. 6 demonstrates that a dead man dependency technique reduces recovery time.

Turning to the timing of events at Site 2, indicated by upper case t, "T," at a time T0, communication with Site 1 is lost. As mentioned above, the cluster at Site 2 must wait to be sure that the resources at Site 1 have been completely terminated. Accordingly, Site 2 makes sure an appropriate timeout has occurred to ensure that resources A, B, and C at Site 1 have been terminated. In that regard, after timeout of the resources A, B, and C at Site 1 at the time t5', Site 2 acquires a token at time T1' from the cluster resource administrator (not illustrated in FIG. 4). As compared to the timing of analogous events without the dead man dependency technique being implemented (time between T0 and T1), the time between T0 and T1' takes a reduced amount of time, since the termination of resources A, B, and C is initiated simultaneously and shut down at times t2', t3' and t4', respectively.

With the token having been acquired, Site 2 is now ready (at time T2') to start recovery of the resources A, B, and C that were terminated at Site 1. Accordingly, Site 2 simultaneously initiates start-up of resources A and C. Site 2 waits to initiate the start-up of resource B until after start-up of resource C has completed, since resource B depends on resource C. In this regard, the start-up of resources A and C are completed at respective times T3' and T4'. The start-up of resource C is completed at a time T5' a long time after the start-up of resource C has completed. At a time T6', cluster recovery is completed.

As illustrated in FIG. 6 (with dead man dependency being implemented), the delay between when the communication between Site 2 and Site 1 is lost (time T0), and when Site 2 receives timeout of resources A, B, and C running at Site 1 (time T1') is reduced in comparison to the analogous timing T0 and T1 shown in FIG. 5 (without dead man dependency being implemented). Accordingly, FIG. 6 demonstrates that dead man dependency reduces recovery time.

With respect to the dead man dependency technique described above, alternative embodiments may use another type of mechanism as a source for dependency. For example, another type of dependency mechanism includes an attribute or property associated with a respective node or cluster site. Alternatively, a dependency mechanism may include another process running on the same node as a respective resource or a different node as the respective resource. In yet another example, a dependency mechanism includes a temperature of a respective node in the cluster. In an additional example, a dependency mechanism includes another software service.

The embodiments discussed above with respect to the dead man dependency technique involve powering down a node. However, alternative embodiments may use other methods for node recovery. For example, fencing on the failed node may be implemented instead. In addition, the examples described above with respect to FIG. 2 assume for sake of discussion that the cluster resource manager 121 is active on server 4A and thus, assumes that the policy engine 122 receives the status of the cluster 120 and the current configuration from the cluster resource manager 121, and that the cluster resource manager 121 observes the node failure in the cluster 102. In an alternative embodiment, one of the cluster resource managers 120 is active on one of the servers 1A, 2A, 3A and thus, the cluster resource manager 120 may observe the node failure in the cluster 102, and the policy engine 122 may receive either of the status of the cluster 102 and the current configuration from the cluster resource manager 120. Moreover, examples described above with respect to FIG. 4 assume for sake of discussion that the cluster manager 121' observes the acquisition of the token. In an alternative embodiment, one of the cluster resource managers 120' may observe the acquisition of the token. Further, the examples described above with respect to FIGS. 1 and 4 respectively describe policy engines 122, 122' associated therewith respective cluster resource managers 121, 121'. In alternative embodiments, the policy engines 122, 122' are respectively distributed on more than one node.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for implementing a dead man dependency technique in a cluster comprising a plurality of interconnected nodes, one of the nodes comprising a cluster resource manager, and one of the nodes comprising a policy engine, the policy engine maintaining at least one dependency associated with a first resource executing on one of the nodes, the method comprising:
   responsive to a status change of an attribute associated with the first resource, the policy engine receiving from the cluster resource manager an indication of the status change;
   the policy engine receiving from the cluster resource manager information regarding a configuration of the cluster;
   responsive to receipt of the status change indication and the configuration information, identifying by the policy engine a manner of terminating the first resource and migrating the first resource to another one of the nodes; and
   providing by the policy engine to the cluster resource manager an instruction sequence for causing the identified manner of terminating the first resource and migrating the first resource to another one of the nodes.

2. The method of claim 1 wherein the attribute includes ownership of a token.

3. The method of claim 2 wherein the status change includes loss of ownership of the token.

4. The method of claim 1 wherein the attribute includes a connection between the node on which the first resource is executing and another node in the cluster.

5. The method of claim 4 wherein the status change includes loss of the connection.

6. The method of claim 1 wherein the configuration information includes configuration of the cluster around the time of the status change of the attribute associated with the first resource.

7. The method of claim 1,
   wherein the manner of migrating the first resource to another node includes migrating the first resource to a geographically dispersed node;
   wherein the dependency includes dependence on a second resource; and
   wherein the manner of terminating the first resource includes simultaneously terminating the first resource and the second resource.

8. The method of claim 1, wherein the policy engine is distributed among more than one of the nodes in the cluster.

9. A system for implementing a dead man dependency technique in a cluster comprising a plurality of interconnected nodes, one of the nodes comprising a cluster resource manager, and one of the nodes comprising a policy engine, the policy engine maintaining at least one dependency with a first resource executing on one of the nodes, the method comprising:

responsive to a status change of an attribute associated with the first resource, means for receiving from the cluster resource manager an indication of the status change;

means for the policy engine receiving from the cluster resource manager information regarding a configuration of the cluster;

responsive to receipt of the status change indication and the configuration information, means for identifying by the policy engine a manner of terminating the first resource and migrating the first resource to another one of the nodes; and means for providing by the policy engine to the cluster resource manager an instruction sequence for causing the identified manner of terminating the first resource and migrating the first resource to another one of the nodes.

10. The system of claim 9 wherein the attribute includes ownership of a token.

11. The system of claim 10 wherein the status change includes loss of ownership of the token.

12. The system of claim 9 wherein the attribute includes a connection between the node on which the first resource is executing and another node in the cluster.

13. The system of claim 12 wherein the status change includes loss of the connection.

14. The system of claim 9,
wherein the configuration information includes configuration of the cluster around the time of the status change of the attribute associated with the first resource;
wherein the manner of migrating the first resource to another node includes means for migrating the first resource to a geographically dispersed node;
wherein the dependency includes dependence on a second resource; and
wherein the manner of terminating the first resource includes simultaneously terminating the first resource and the second resource.

15. A computer program product comprising computer-readable medium having stored thereon instructions executable by a computer for implementing a dead man dependency technique in a cluster comprising a plurality of interconnected nodes, one of the nodes comprising a cluster resource manager, and one of the nodes comprising a policy engine, the policy engine maintaining at least one dependency associated with a first resource executing on one of the nodes, the instructions executable by the computer for causing the computer to:

responsive to a status change of an attribute associated with the first resource, receive by the policy engine from the cluster resource manager an indication of the status change;

receive by the policy engine from the cluster resource manager information regarding a configuration of the cluster;

responsive to receipt of the status change indication and the configuration information, identifying by the policy engine a manner of terminating the first resource and migrating the first resource to another one of the nodes; and provide from the policy engine to the cluster resource manager an instruction sequence for causing the identified manner of terminating the first resource and migrating the first resource to another one of the nodes.

16. The computer program product of claim 15 the attribute includes ownership of a token.

17. The computer program product of claim 16 wherein the status change includes loss of ownership of the token.

18. The computer program product of claim 15 wherein the attribute includes a connection between the node on which the first resource is executing and another node in the cluster.

19. The computer program product of claim 18 wherein the status change includes loss of the connection.

20. The computer program product of claim 19,
wherein the configuration information includes configuration of the cluster around the time of the status change of the attribute associated with the first resource;
wherein the manner of migrating the first resource to another node includes migrating the first resource to a geographically dispersed node;
wherein the dependency includes dependence on a second resource; and
wherein the manner of terminating the first resource includes simultaneously terminating the first resource and the second resource.

* * * * *